April 18, 1933.  V. ROYLE  1,904,884

EXTRUDING MACHINE

Filed June 4, 1929  2 Sheets-Sheet 1

INVENTOR
BY Vernon Royle
his ATTORNEYS

April 18, 1933.                V. ROYLE                 1,904,884
                          EXTRUDING MACHINE
                       Filed June 4, 1929        2 Sheets-Sheet 2

INVENTOR
BY Vernon Royle
his ATTORNEYS

Patented Apr. 18, 1933

1,904,884

UNITED STATES PATENT OFFICE

VERNON ROYLE, OF PATERSON, NEW JERSEY

EXTRUDING MACHINE

Application filed June 4, 1929. Serial No. 368,371.

This invention relates to an extruding machine designed primarily for the purpose of forming a rod or rope of plastic crude rubber which has been affected by a kneading or breaking up action and by heat so as to improve its adaptability for compounding and use in the rubber industry.

The invention has for an object the provision of a machine of the nature of an extruding machine but which acts upon the rubber in a manner analogous to the action of a mill so as to treat or break up the crude rubber for purposes well understood in this industry.

Another object consists in providing such a machine that includes a screw or plodder which is encompassed by parts of such shape as to resist the forward movement of the crude rubber driven by the screw and thereby break it up and heat it through friction while permitting its passage to the extruding outlet.

Another object consists in providing such a machine that includes a screw surrounded by threaded elements which lie in a direction out of conformity with the thread on the screw.

Another object consists in providing such a machine that includes a screw surrounded by elements which are formed with partial threads that are very shallow at one end and graduate to substantial depth at the other end.

Another object consists in providing such a machine that includes a screw of particular shape adapted for the purpose in hand.

Another object consists in providing improved means for heating the material while being acted upon by the machine.

A further object consists in providing certain improvements in the form, construction and arrangement of the several parts whereby the above named and other objects may effectively be attained.

Practical embodiments of the invention are represented in the accompanying drawings in which Fig. 1 represents a longitudinal section through the cylinder of an extruding machine including my invention.

Figure 1:
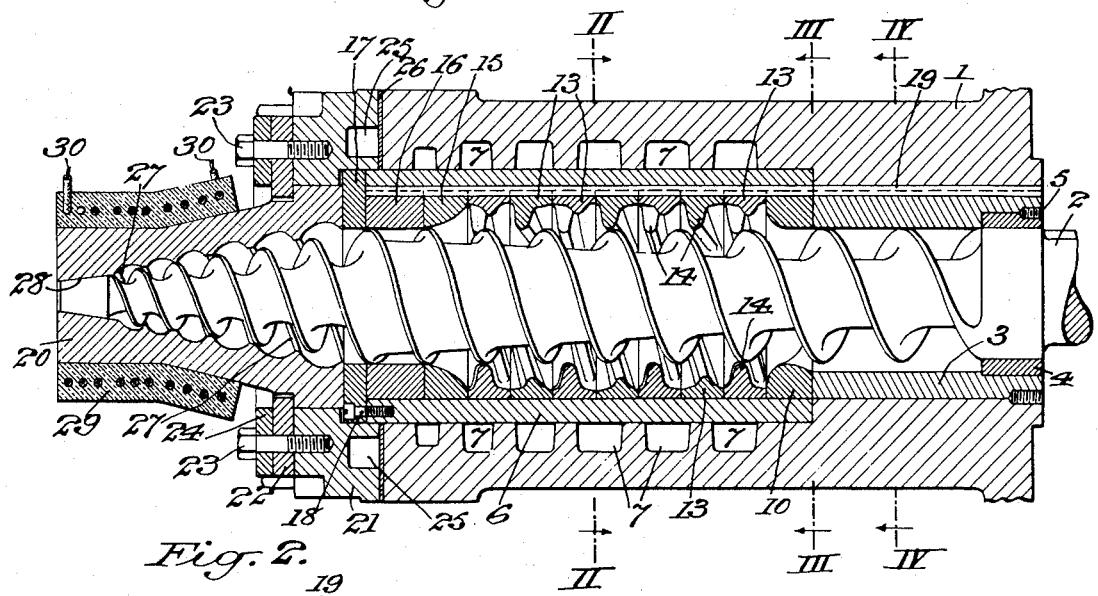

Referring to the preferred form, shown in Figs. 1 to 5 inclusive, the part 1 denotes a cylinder which is similar to the cylinder of an ordinary tubing or extruding machine, and which is designed to be suitably supported and to house a screw or plodder 2 that is driven by any well known or approved mechanism. The support for the cylinder and the mechanism for driving the screw are well known to this art in various forms and hence will neither be shown nor described herein since their particular construction forms no part of this invention.

The cylinder 1 is bored for the reception of a liner 3 which is shouldered to house a bearing 4 that receives and journals the rear portion of the screw. The bearing 4 is secured in position by a set screw 5.

Forwardly of the line 3, the cylinder 1 is enlarged to receive a sleeve 6, and the walls of the cylinder 1, surrounding the sleeve, are grooved to constitute chambers or passages 7 for the circulation of a temperature controlling medium such, for instance, as hot water.

The screw itself is of particular form, as well represented in Fig. 1; and it will be noted that the diameter of its stock gradually increases from the rear end for a distance of about two thirds its length, and that it thereafter decreases until the forward extremity is reached. The longitudinal pitch of the thread on the screw preferably decreases from the rear end to the front. These characteristics of the stock and thread cooperate with the other elements of the machine to promote fulfillment of its designed function and objects.

Figure 4:
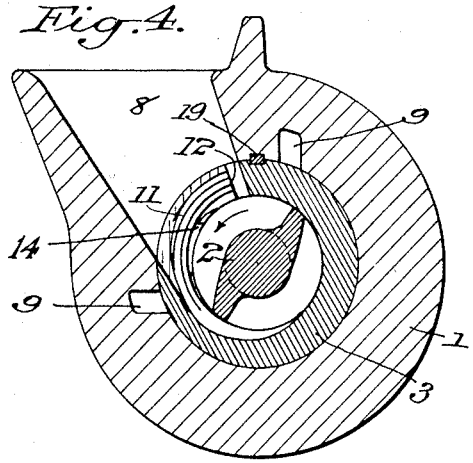
Fig. 4 represents a section taken in the plane of the line IV—IV of Fig. 1, looking in the direction of the arrows.

That portion of the cylinder 1 adjacent the liner 3 is provided with a throat 8 that is designed for the infeeding of the crude rubber, and the corresponding wall of liner 3 is cut away, as clearly shown in Fig. 4, in order to permit the rubber to pass in to the screw 2 so as to be forced forwardly by the latter in the usual way. The particular construction of these parts is set forth in my United States Patent 1,645,157, dated October 11th, 1927, and it suffices here to note that the throat has an eccentric portion for easing the feed of the material to the screw. This part of the cylinder is also formed with passages 9 that serve for the circulation of the heat controlling medium from its source of supply through the chambers or passages 7 back to the source, in a well understood manner.

Figure 3:
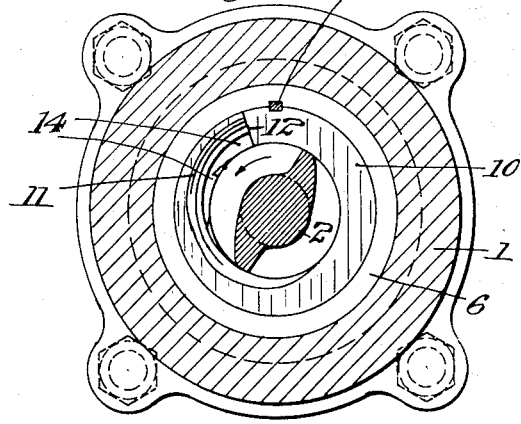
Fig. 3 represents the section taken in the plane of the line III—III of Fig. 1, looking in the direction of the arrows.

The interior of the sleeve 6 is furnished with a number of annular elements that are designed to cooperate with the screw. The one of these elements adjacent the liner 3 is denoted by 10 and it is formed on its inner periphery substantially like a partial screw thread or, in other words, similarly to a screw thread that has been cut through on a plane normal to the longitudinal axis of the screw. The longitudinal pitch or angularity of this partial thread is contrary to that of the thread on the screw so as to, at the outset of the forward movement of the material under the impulse of the screw, establish a certain resistance tending to generate friction which will heat the crude rubber and also tending to break up the latter, as hereinabove pointed out. On the other hand, the cross sectional shape of this element 10 is curved on its inner circumference so as to enable the forward movement of the rubber mass in spite of the resistance due to the factors just named. In this connection it may be noted that the formation of the partial screw thread in this element 10 gives a certain eccentricity to a portion of it, when viewed on the line of the axis of the screw, as shown in Fig. 3, and this facilitates the forcing of the rubber from the interior of liner 3 into and through element 10. This portion of the said element is denoted by 11 in Figs. 3 and 4, and it will be observed that it consists of a sort of curved bevel on the face of the element 10 adjacent to liner 3, which bevel gradually increases in width until it terminates at a shoulder 12 formed on the said face. This formation has a tendency to cooperate with the forcing action of the screw in definitely initiating the forward movement of the material through the machine. It will be noted that the internal diameter of the element 10 is substantially the same as the external diameter of the adjacent portion of thread on the screw 2, so that there is little opportunity for any of the material to move forwardly other than in the channel bounded by the thread on the screw and the contiguous surface of element 10. Therefore the material is necessarily subjected to the action hereinabove described which results from the formation of the said cooperating parts.

A set of seven annular elements or rings are located within sleeve 6 forwardly of element 10 and, as these rings are all the same, they are given the same reference number 13. Each ring 13 has its inner circumference fashioned to constitute a set of five partial threads 14 which are all alike. Each partial thread is of substantial depth, considered in a radial direction, at one end and gradually slopes off until the other end melts or disappears into the inner circumference of the ring. The deep end of each partial thread is adjacent one side edge of the ring and the shallow end is adjacent the opposite side edge, which arrangement is due to the pitch or slanting formation of the partial threads. Furthermore, the deep end of each partial thread 14 is adjacent the disappearing or shallow end of the next partial thread, considered in a circumferential direction, but the said deep and shallow ends are offset from each other in an axial direction because of the slant or longitudinal pitch of the partial threads, as is well shown in Fig. 5.

Figure 2:
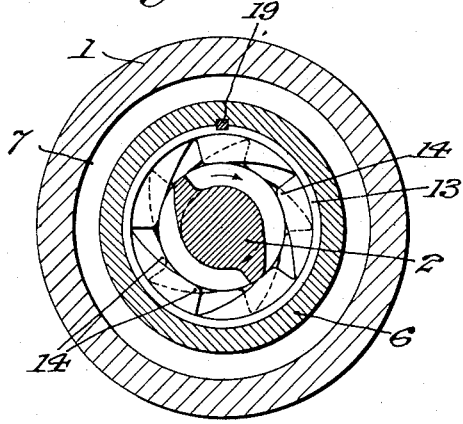
Fig. 2 represents a section taken in the plane of the line II—II of Fig. 1, looking in the direction of the arrows.
Figure 5:
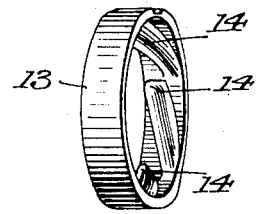
Fig. 5 represents a detail perspective view of one of the elements surrounding the screw.

While these rings 13 are all alike, they are arranged in staggered relationship, considered in a circumferential direction, within sleeve 6 and, as shown in Fig. 2, this arrangement is such that the deep part of each partial thread of a ring 13 is substantially in axial alinement with the shallow part of a partial thread on an adjacent ring. This arrangement prevents a series of axial grooves being established in the set of rings 13 exterior to the thread on screw 2, which grooves might be formed if the deep parts of the partial threads were all placed in axial alinement; and, on the other hand, produces a series of sinuous or zig-zag channels projected axially between the thread of the screw and the partial threads on the rings. Finally, it should be noted that the deep portions of the partial threads have such a radial dimension as substantially to contact with the contiguous part of the thread on the screw, and that the longitudinal pitch or angularity of the partial threads is opposite to that of the cooperating portion of the thread on the screw.

The result of the form and arrangement of the parts just described is that the forward movement of the crude rubber is strongly resisted and a severe breaking up action is applied to the rubber. Passages are provided to permit of the forward movement, but they are so formed as to restrict it and to intermittently severely check it. This action is heightened by the gradually increasing diameter of the stock of the screw because this correspondingly constricts the area of the passages through which the material is being forced. Such constriction is permissible and advantageous because the heating of the material due to friction in addition to the medium circulating chambers 7, together with the breaking up action, progressively brings the material to such a condition that it is more easily fed forwardly by the screw and it must, therefore, be subjected to more severe restrictions upon its movement if the full effect of friction and the full effect of the breaking up action are to be maintained.

Forwardly of the set of seven rings 13, there are located within sleeve 6 two more rings 15 and 16. Ring 15 has its inner circumference tapered in cross section from the rear edge to the forward edge so as to restrict its front diameter to substantially that of the cooperating portion of the thread on the screw, and this necessarily greatly restricts the forward movement of the rubber because it limits its passage to the channel formed by the thread on the screw, which channel is quite small because of the increased diameter of the screw stock, hereinabove pointed out.

Ring 16 is cylindrical on its inner periphery and is intended to contact with the thread of and establish a front bearing for the screw or plodder 2.

A clamping ring 17 is fastened to the front end of sleeve 6 by screws 18 and serves removably to hold the rings 10, 13, 15 and 16 in place.

In order to prevent circumferential movement of any of said rings or of the liner 3 and sleeve 6, an elongated key or spline 19 is provided which extends from the rear face of cylinder 1 to clamping ring 17.

The removability of the rings, as just explained, enables any of them to be reversed in position, if desired; and this particularly relates to reversing some or all of rings 13 so as to have their partial threads 14 correspond in angularity to instead of conflicting with the angularity of the cooperating portion of the thread on the screw. Particular characteristics of different batches of rubber may lead the operator in his judgment to take advantage of this capacity of the machine because such differing characteristics may call for differences in the severity of the treatment best calculated to bring the material to the desired state.

The machine includes a head 20 which is removably secured to the cylinder 1 in such a manner as to very firmly hold it in place while yet permitting ready assembling and disassembling. The structural arrangement prividing for the attachment of the head to the cylinder is set forth in my copending application for United States patent Serial No. 118,867, filed June 26th, 1926, so that the same will not be detailed herein otherwise than to apply reference numerals and names to the parts. The face ring that is bolted to the cylinder is denoted by 21, the locking ring which engages the head by 22, the cap screws which secure the latter to the former by 23, and the annular washer which is interposed between the heads of the cap screws and the locking ring by 24. A chamber for the circulation of the temperature controlling medium is marked 25 and may be suitably connected in the circulating system, in a well understood manner. A gasket 26 is located between face ring 21 and cylinder 1.

The interior of the head 20 is tapered from clamping ring 17 forwardly and is fashioned to constitute a screw thread 27 of decreasing diameter, decreasing depth, and decreasing longitudinal pitch. The portion of the screw 2 that is embraced by the head is likewise tapered with respect to the diameter of its stock and diameter of its thread and the latter also gradually decreases in its longitudinal pitch. At the forward end of the screw, the head 20 is formed with a die opening 28 that is in the form of a truncated cone which also tapers forwardly. It should further be noted that the angularity or longitudinal pitch of the thread 27 on the interior of the head is contrary to that of the cooperating part of the thread on the screw 2.

The result of the formation of parts just described is that the passage for the rubber is further constricted on a graduating scale and that the movement of the material is also resisted by the conflicting angularity of the thread on the screw and thread on the head. Finally, the taper of the die opening 28 imparts a crowding and compressing action to the material as is extruded in the form of a rod or rope, which may be cut into convenient lengths for shipment or use in accordance with the demands of the situation.

In order to assist in maintainng the desired temperature of the material, the head 20 is surrounded by an electric heating unit 29 which may be connected by wires 30 with a suitable source of current, not shown.

Referring to the modified form shown in Figs. 6 and 7, it may be said that the parts are the same as described in connection with the preferred form, except that the annular elements or rings 10, 13 and 15, are substituted by rings 31 which are all alike. Each of the said rings is formed in cross section so as to be convex on its inner circumference, as well shown in Fig. 6, and is formed in circumferential cross section so as to be corrugated, as clearly shown at 32 in Fig. 7. The said rings are staggered so that each one is at a slight angular position in advance of the preceding one, and the valleys in the corrugations shown in Fig. 7 are at an angle to the axis and are arranged to aline throughout the set of rings 31 so as to establish spiral grooves running longitudinally throughout the set of rings and lying at a slight angle to the axis of the screw. This arrangement of the parts is shown by the full and dotted lines in Fig. 7. The operation of this form is the same as that of the preferred form, but it will be realized that the action upon the rubber will differ in intensity. It is not regarded as necessary to describe or number the other parts shown in Figs. 6 and 7 because they correspond substantially if not exactly with the similar parts of the preferred form.

Figure 6:
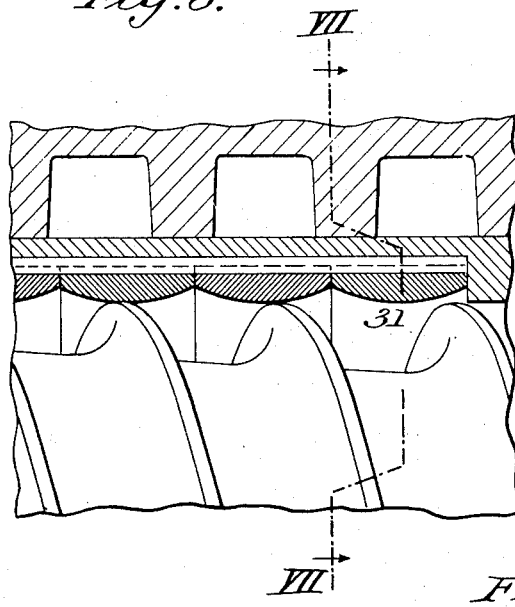
Fig. 6 represents an enlarged detail longitudinal section showing a modified form.
Figure 7:
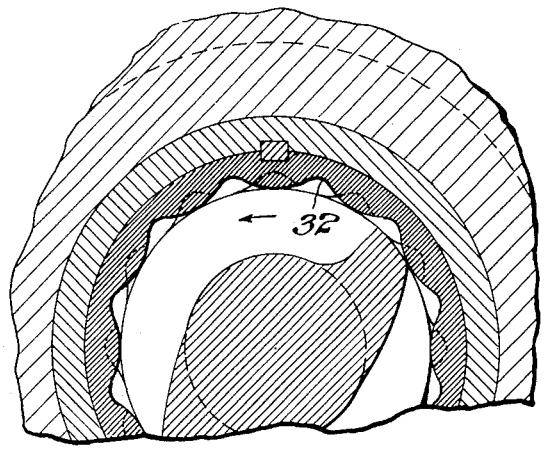
Fig. 7 represents a detail section taken in the plane of the line VII—VII of Fig. 6, looking in the direction of the arrows.
Figure 8:
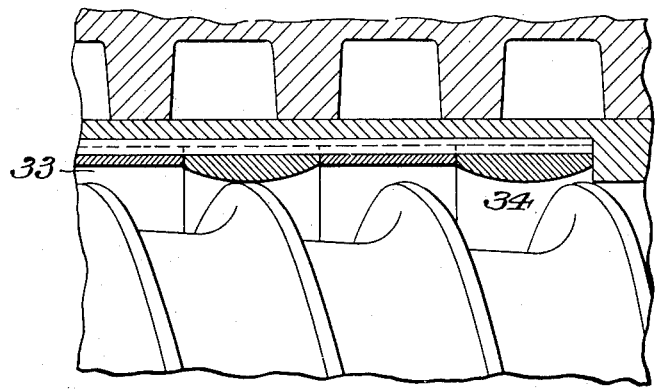
Fig. 8 represents a detail longitudinal section showing a second modified form, on the same scale as Figs. 6 and 7.

Referring to the second modified form shown in Fig. 8, it may be said that this is the same as the form of Figs. 6 and 7 except that plane cylindrical rings 33 intervene between the rings corresponding to 31 and which are here marked 34. This arrangement interrupts the spiral grooves indicated by 32 in Fig. 7 and also provides spaces within which the material can intermittently expand because of the distance between the thread on the screw and the interior of the rings 33. The operation is the same as hereinabove described but, of course, differs in intensity. It is not considered to be necessary to describe or number the other parts of this form which are the same as in the forms already described.

Figure 9:
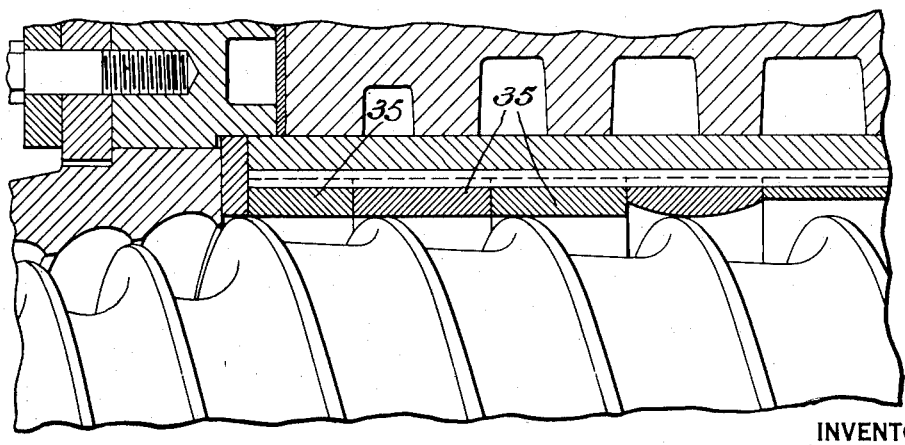
Fig. 9 represents a detail longitudinal section showing a third modified form, on the same scale.

Referring to the third modified form shown in Fig. 9, it may be said that this is the same as that shown in Fig. 8 except that three plane cylindrical rings 35 are substituted for the bearing ring 16 which is shown in Fig. 1, and serve to constitute an elongated bearing for the adjacent portion of the screw and also to establish a long constricted area through which the rubber must pass. The operation of this form is also the same as with the other forms except that it differs in intensity, and it is likewise regarded as unnecessary to apply reference numerals to or describe the common elements.

As the operation of the machine has been set forth in connection with the description of the form and arrangement of the several parts, there is no necessity for restating it at this juncture, but it may be said that the conception and design of the machine provide capacity for acting upon crude rubber of varying characteristics so as to bring it to that condition in which it is readily adaptable to the subsequent steps commonly followed in compounding the same and manufacturing articles therefrom. The parts constituting my invention are readily adaptable to any well known or approved form of tubing or extruding machine and will thus provide a machine which rapidly and efficiently performs the intended function and supplies the material in a condition which is suitable and convenient for transportation and use. It may be remarked that the parts should be made quite strong and securely fastened together in order to withstand the strain of operating, as indicated, upon crude rubber.

It will be understood that various changes may be resorted to in the form, construction, and arrangement of the several parts without departing from the spirit and scope of my invention; and hence, I do not intend to be limited to the details herein shown and described except as they may be included in the claims.

What I claim is:

1. In a machine of the character described, a head having its interior tapered and provided with a thread of gradually decreasing depth and longitudinal pitch, said decrease in pitch progressing in the same direction as the taper.

2. A machine of the character described comprising, a feed screw, a throat for supplying material to the screw, said throat having an eccentric portion, and a separate annular element surrounding the screw and having an eccentric portion formed on its inner circumference for cooperation with the forward end of the eccentric portion of the throat.

3. A machine of the character described comprising, a feed screw, a throat for supplying material to the screw, said throat having an eccentric portion, and a separate annular element surrounding the screw and having an eccentric portion formed on its inner circumference for cooperation with the forward end of the eccentric portion of the throat, said element having its inner surface curved in cross section to promote the forward movement of the material.

4. A machine of the character described comprising, a feed screw, a throat for supplying material to the screw, and a separate annular element surrounding the screw adjacent the throat, said element having its inner circumference formed in the shape of a partial screw thread gradually increasing in width.

5. A machine of the character described comprising, a feed screw, a throat for supplying material to the screw, and a separate annular element surrounding the screw adjacent the throat, said element having its inner circumference formed in the shape of a partial screw thread gradually increasing in width with a longitudinal pitch counter to that of the thread on the screw.

6. A machine of the character described comprising, a feed screw, a throat for supplying material to the screw, and a separate annular element surrounding the screw adjacent the throat, said element having its inner circumference formed in the shape of a partial screw thread gradually increasing in width and curved in cross section.

7. A machine of the character described comprising, a feed screw, a throat for supplying material to the screw, and a separate annular element surrounding the screw adjacent the throat, said element having its inner circumference formed in the shape of a partial screw thread gradually increasing in width with a longitudinal pitch counter to that of the thread on the screw and said element having its interior curved in cross section.

8. A machine of the character described comprising, a feed screw, and a series of removable annular elements juxtaposed and surrounding the screw, said elements having a set of circumferentially arranged formations spaced apart on their interiors, said formations being deeper in a radial direction at one portion than another.

9. A machine of the character described comprising, a feed screw, and a series of removable annular elements juxtaposed and surrounding the screw, said elements having a set of circumferentially arranged formations spaced apart on their interiors, said formations being deeper in a radial direction at one end than the other.

10. A machine of the character described comprising, a feed screw, and a series of removable annular elements juxtaposed and surrounding the screw, said elements having a set of circumferentially arranged formations spaced apart on their interiors, said formations being of substantial depth in a radial direction at one portion and of no substantial depth at another portion.

11. A machine of the character described comprising, a feed screw, and a series of removable annular elements juxtaposed and surrounding the screw, said elements having a set of circumferentially arranged formations spaced apart on their interiors, said formations being of substantial depth in a radial direction at one end and of no substantial depth at the other end.

12. A machine of the character described comprising, a feed screw, and a series of removable annular elements juxtaposed and surrounding the screw, said elements having a set of circumferentially arranged formations spaced apart on their interiors, said formations being deeper in a radial direction at one portion than another and said formations being disposed at an angle to the longitudinal axis of the screw.

13. A machine of the character described comprising, a feed screw, and a series of removable annular elements juxtaposed and surrounding the screw, said elements having a set of circumferentially arranged formations spaced apart on their interiors, said formations being deeper in a radial direction at one end than the other and said formations being disposed at an angle to the longitudinal axis of the screw.

14. A machine of the character described comprising, a feed screw, and a series of removable annular elements juxtaposed and surrounding the screw, said elements having a set of circumferentially arranged formations spaced apart on their interiors, said formations being of substantial depth in a radial direction at one portion and of no substantial depth at another portion and said formations being disposed at an angle to the longitudinal axis of the screw.

15. A machine of the character described comprising, a feed screw, and a series of removable annular elements juxtaposed and surrounding the screw, said elements having a set of circumferentially arranged formations spaced apart on their interiors, said formations being of substantial depth in a radial direction at one end and of no substantial depth at the other end and said formations being disposed at an angle to the longitudinal axis of the screw.

16. A machine of the character described comprising, a feed screw, and a series of removable annular elements juxtaposed and surrounding the screw, said elements having a set of circumferentially arranged formations spaced apart on their interiors and the formations on an element being out of axial alinement with the formations on an adjacent element.

17. A machine of the character described comprising, a feed screw, and a series of removable annular elements juxtaposed and surrounding the screw, said elements having a set of circumferentially arranged formations spaced apart on their interiors, said formations being deeper in a radial direction at one portion than another, the formations on the elements being so arranged that the deep portions of the formations on an element are substantially in axial alinement with the portions of less depth on an adjacent element.

18. In a machine of the character described, a series of removable annular elements juxtaposed in horizontal alinement to surround the feed screw and designed to cooperate therewith, said elements having internally projecting formations spaced apart and arranged to retard the longitudinal movement of the outer portion of the mass of material and allow the screw to force the inner portion of the material forwardly.

19. In a machine of the character described, a series of removable annular elements juxtaposed in horizontal alinement to surround the feed screw and designed to cooperate therewith, said elements having internally projecting formations spaced apart and shaped to facilitate the movement of the outer portion of the material forwardly and in a rotary direction at one speed, while the screw forces the inner portion of the material at another speed.

In testimony, that I claim the foregoing as my invention, I have signed my name this 24th day of May, 1929.

VERNON ROYLE.